United States Patent
Meek et al.

(10) Patent No.: US 6,823,842 B2
(45) Date of Patent: Nov. 30, 2004

(54) METHOD AND SYSTEM FOR REDUCING ENGINE SPARK KNOCK DURING RAPID TRANSIENT

(75) Inventors: Bruce Allen Meek, Highland, MI (US); Mark Sabuda, Livonia, MI (US); Robert Sarow Baskins, Grass Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 96 days.

(21) Appl. No.: 10/249,157

(22) Filed: Mar. 19, 2003

(65) Prior Publication Data

US 2004/0182364 A1 Sep. 23, 2004

(51) Int. Cl.[7] ................................................. F02P 5/09
(52) U.S. Cl. ........................ 123/406.29; 123/406.5; 123/406.64
(58) Field of Search ..................... 123/406.18, 406.19, 123/406.2, 406.21, 406.24, 406.29, 406.52, 406.64, 406.5, 406.59

(56) References Cited

U.S. PATENT DOCUMENTS

| | | | | |
|---|---|---|---|---|
| 4,869,221 A | * | 9/1989 | Abe | 123/406.62 |
| 4,896,639 A | * | 1/1990 | Holmes | 123/406.24 |
| 5,003,950 A | | 4/1991 | Kato et al. | |
| 5,090,382 A | * | 2/1992 | Bolander et al. | 123/406.33 |
| 5,445,127 A | | 8/1995 | Cullen et al. | |
| 5,483,941 A | * | 1/1996 | Cullen et al. | 123/481 |
| 5,517,968 A | | 5/1996 | Hori et al. | |
| 2003/0144789 A1 | * | 7/2003 | Le Gall et al. | 701/105 |

* cited by examiner

Primary Examiner—Henry C. Yuen
Assistant Examiner—Arnold Castro

(57) ABSTRACT

A method for controlling spark timing. A plurality of tables provides borderline timing data contributors for each of a corresponding one of a plurality of different engine operating conditions. The contributors in each table are a function of engine speed and air charge. Background borderline spark timing is determined at a background computational rate from a summation of the borderline timing data in the plurality of tables data in the plurality of tables at engine speed measured at the borderline computational rate and air charge determined at the borderline computational rate. A one-dimensional table has borderline timing data contributors extracted from the provided tables. The extracted borderline timing data contributors are the engine sped measured at the borderline computational rate and the air charge determined at the borderline computational rate. From the one-dimensional table, foreground borderline spark timing is determined at a higher, foreground computational rate.

16 Claims, 3 Drawing Sheets

FIG. 2
Prior Art

METHOD AND SYSTEM FOR REDUCING ENGINE SPARK KNOCK DURING RAPID TRANSIENT

BACKGROUND OF INVENTION

1. Technical Field

This invention relates generally to methods and systems for controlling the ignition timing of an internal combustion engine and more particularly to methods and systems for reducing engine knock during rapidly changing operating conditions (i.e., during rapid transients).

2. Background of the Invention

As is known in the art, it is desirable for an internal combustion engine to determine a spark advance parameter based on an estimate of cylinder air charge. The spark advance parameter generally represents the angle of the crankshaft at which the spark is fired in the combustion chamber. By accurately determining and using the spark advance parameter, fuel economy can be increased and engine knock can be avoided.

Under normal operating conditions, spark timing is based on Minimum spark advance for Best Torque (MBT) considerations. MBT is the spark timing providing peak power and fuel economy. During a rapid change in acceleration, however, often referred to as a tip-in event or a rapid transient, engine knock may be experienced if using MBT as the sole criteria for spark timing.

As is known in the art, borderline spark timing is also determined in response to a tip-in event. Borderline spark timing is spark timing which avoids knock. Borderline spark timing is retarded, with respect to MBT timing. It should be noted that both the MBT based spark timing and the borderline base timing are a function of cylinder air charge.

One technique used to reduce engine spark knock during a rapid transient, i.e., tip-in, is described in U. S. Pat. No. 5,445,127, "Method and System for Reducing Engine Spark Knock During a Rapid Transient", inventors Cullen et al., issued Aug. 29, 1995, assigned to the same assignee as the present invention, the entire subject matter thereof being incorporated herein by reference.

In one known system, the borderline spark timing calculation is performed along with the MBT based timing calculation at regular time intervals, i.e., background computational events. The computations are performed using tables stored in a memory used in the engine control unit, sometimes referred to as the Engine Control Unit (ECU). An example of such tables used to determine borderline timing is shown in FIG. 2. A similar set of tables is used to determine MBT based timing. Thus, referring to FIG. 2, TABLE I, provides a base borderline spark timing for a cylinder approaching top dead center (TDC), here indicated as Base Borderline (BDL) for a relationship between cylinder air charge, here also referred to as load, (i.e., the Y-axis) as a function of engine speed, N, (i.e., the X-axis).

TABLES II through VIII are modifier tables which store data used to modify the base borderline spark timing of TABLE I. TABLE II shows swirl valve modifiers (Intake Manifold Runner Control (IMRC) modifiers) for a relationship between cylinder air charge, here also referred to as load, (i.e., the Y-axis) as a function of engine speed, N, (i.e., the X-axis). Thus, for a particular engine speed and air charge, the value stored in the TABLE II at such condition is multiplied by an a priori determined IMRC constant and the product is added to the Base BDL determined from TABLE I.

TABLE III shows cam position modifiers for a relationship between cylinder air charge, here also referred to as load, (i.e., the Y-axis) as a function of engine speed, N, (i.e., the X-axis). Thus, for a particular engine speed and air charge, the value stored in the TABLE III at such condition is multiplied by the cam angle of the cylinder to be fired and the product is also added to the Base BDL determined from TABLE I.

TABLE IV shows Engine Coolant Temperature (ECT) modifiers for a relationship between cylinder air charge, here also referred to as load, (i.e., the Y-axis) as a function of engine speed, N, (i.e., the X-axis). Thus, for a particular engine speed and air charge, the value stored in the TABLE IV at such condition is multiplied by a number which is a stored function of measure ECT and the product is also added to the Base BDL determined from TABLE I.

TABLE V shows Air Temperature (ACT) modifiers for a relationship between cylinder air charge, here also referred to as load, (i.e., the Y-axis) as a function of engine speed, N, (i.e., the X-axis). Thus, for a particular engine speed and air charge, the value stored in the TABLE V at such condition is multiplied by a number which is a stored function of measure ACT and the product is also added to the Base BDL determined from TABLE I.

TABLE VI shows Cylinder Head Temperature (Cht) modifiers for a relationship between cylinder air charge, here also referred to as load, (i.e., the Y-axis) as a function of engine speed, N, (i.e., the X-axis). Thus, for a particular engine speed and air charge, the value stored in the TABLE VI at such condition is multiplied by a number which is a stored function of measure Cht (Cylinder head Temperature) and the product is also added to the Base BDL determined from TABLE I. The Cht values are not used during normal operation. They are only used during failure mode management for a loss of engine coolant.

TABLE VII shows "Lugging time" modifiers for a relationship between cylinder air charge, here also referred to as load, (i.e., the Y-axis) as a function of engine speed, N, (i.e., the X-axis). Thus, for a particular engine speed and air charge, the value stored in the TABLE VI at such condition is multiplied by a number which is a stored function of measure "Lugging time" and the product is also added to the Base BDL determined from TABLE I. "Lugging time" refers to the elapsed time following a large increase in air charge, i.e. the elapsed time following a heavy tip-in event.

TABLE VIII shows "Octane adjustment" modifiers for a relationship between cylinder air charge, here also referred to as load, (i.e., the Y-axis) as a function of engine speed, N, (i.e., the X-axis). Thus, for a particular engine speed and air charge, the value stored in the TABLE VI at such condition is multiplied by an "Octane Adjustment" constant and the product is also added to the Base BDL determined from TABLE I. The "Octane Adjustment" constant is normally set to '0,' in the absence of octane information. However, it may set to a non-zero value to adjust for different fuel Octane levels, should such octane data be available. Alternatively, it may also be set to a non-zero value in the event of that a knock sensor becomes inoperable.

Other non-speed and air charge based modifiers are also added to the Base BDL determined from TABLE I. The summation is referred to as "Borderline Spark".

TABLE IX shows Engine Coolant Temperature (ECT) modifiers for a relationship between Air Temperature (ACT) as a function of engine speed, N, (i.e., the X-axis). Thus, for a particular engine speed and ACT, the value stored in the TABLE IX at such condition is multiplied by a number which is a stored function of measured ECT and the product is the "Tip-in Slope".

While ideally the table information described above should be calculated for each cylinder firing event, typically it is done once every 100 milliseconds to reduce the processing load on the ECU. Therefore, in accordance with the prior art, "Borderline Spark" and "Tip-in Slope" computations are made at a background computational rate, every 100 milliseconds, for example. Estimates are made for "Tip-in" timing at each cylinder firing event; i.e., at a foreground computational rate, one each cylinder firing event. Thus, these estimates are made at the foreground computational rate.

More particularly, for each cylinder firing event during a tip-in, the "Tip-in" spark timing is equal to the summation of: "Borderline Spark" determined as described above at the for example, once every 100 millisecond (i.e., at the "background computational rate"); and, the product of "Tip-in Slope", also computed at the background computational rate, and "Δ Air Charge", where "Δ Air Charge" is the change in air charge since the last background computational event and where "Tip-in Slope" is determined from a TABLE IX at the foreground cylinder firing rate.

That is, at the background computational rate, "Borderline Spark" is calculated by summing the values as a function of the current engine speed and current air charge, as described above in connection with TABLES VIII. Also, at the background computational rate, the Tip-in" slope is calculated, as described above in connection with TABLE IX. In between the background computational times, i.e., at the cylinder firing a rate, a Tip-in spark timing value is calculated by multiplying the "tip-in" slope by the change in cylinder air charge since the last background computational time and adding the product to the "Borderline Spark" calculated at the last background computational time.

Thus, in summary, in the prior art, a slope of tip-in timing as a function of air charge change made at the background rate is multiplied by a change in air charge associated with the current cylinder firing. These multiplication product computations are made at the higher foreground computational rate. The product is added to the borderline timing calculated from the last background computation. The most retarded timing of a group of timings which includes tip-in timing, MBT timing and Borderline timing, is used for the actual timing for the next cylinder firing.

While such method provides knock compensation for a tip-in event, the inventors having made certain observation, described below, which enable a more accurate computation of spark timing. More particularly, the inventors having made certain observations, described below, enabling spark timing computations at the cylinder firing rates using air change measurements taken at such cylinder firing rates.

SUMMARY OF INVENTION

In accordance with the present invention, a method for controlling spark timing in an internal combustion engine is provided. The method includes determining background borderline spark timing at a background computational rate. The borderline spark timing is a function of determined air charge and engine speed. The method determines foreground borderline spark timing at a higher, foreground computational rate. The foreground borderline spark timing is a function of air charge determined at the foreground computational rate and engine speed measured at the background computational rate.

The inventors have recognized that engine speed change is small between background computation rate updates, i.e., during cylinder events occurring between background computational events. Thus, borderline timing can be updated at the cylinder event firing rate (i.e., at the foreground rate) using only air charge determined at the foreground computational rate instead of using both engine speed and air charge.

More particularly, the MBT based spark timing and the Borderline Timing are calculated at the background computational rate as a function of engine speed and cylinder air charge from data in an MBT based table and a borderline spark timing based table, respectively. Also, a one-dimensional table of borderline timing is generated comprising data in the borderline spark timing table at the engine speed existing at the time of such background calculations. The one-dimensional table provides a relationship between borderline timing and air charge for the engine speed existing at the time of such background calculations. For each cylinder firing during a tip-in event, (i.e., at a foreground computational rate higher than the background computational rate) a borderline spark timing is determined from the one-dimensional table in response to air charge determined at the foreground computational rate and subsequent to a calculation made at the background computational rate. The tip-in spark timing value is set equal to this foreground borderline spark timing calculation. The most retarded of a group of sparking timing values comprising: MBT based timing; borderline spark timing, and tip-in timing is used as the final spark timing signal for the engine.

To put it another way, according to the invention, it is assumed that the engine speed will not change significantly between successive background computations. Therefore, a one-dimensional table is formed, such table providing borderline timing data as a function of air charge. The data are obtained for the engine speed condition at the last background computation. The data in the one-dimensional table data are used at succeeding foreground rates to provide the borderline timing for the next cylinder firing. The most retarded of a group of timings which includes MBT timing, Borderline timing, and Tip-in timing is used for the actual timing for the next cylinder firing.

In accordance with one embodiment the foreground borderline spark timing is determined in response to a tip-in event.

In accordance with another feature of the invention, a method is provided for controlling spark timing in an internal combustion engine. The method includes providing a plurality of tables. Each one of such tables provides borderline timing data contributors for each of a corresponding one of a plurality of different engine operating conditions. The borderline timing contributors in each one of the tables being a function of engine speed and air charge. The method determines background borderline spark timing at a background computational rate. The borderline spark timing is determined from a summation of the borderline timing data in the plurality of tables data in the plurality of tables at engine speed measured at the borderline computational rate and air charge determined at the borderline computational rate. The method provides a one-dimensional table. The one-dimensional table has borderline timing data contributors extracted from the plurality of provided tables. The extracted borderline timing data contributors being for the engine speed measured at the borderline computational rate and the air charge determined at the borderline computational rate. The method determines from the one-dimensional table foreground borderline spark timing at a higher, foreground computational rate. The foreground borderline spark timing is a function of air charge determined at the foreground computational rate and engine speed measured at the background computational rate. The tip-in spark timing is set equal to this foreground borderline spark timing calculation.

In one embodiment, the foreground computational rate is the firing rate of cylinders in the engine.

In one embodiment, foreground borderline spark timing is determined in response to a tip-in event.

In one embodiment engine spark plug timing is a most retarded timing of a group of spark timings, such group including tip-in timing, MBT timing and the foreground borderline timing.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 2 are tables used to calculate spark timing of an internal combustion engine according to the PRIOR ART.

Like reference symbols in the various drawings indicate like elements.

DETAILED DESCRIPTION

Figure 1:
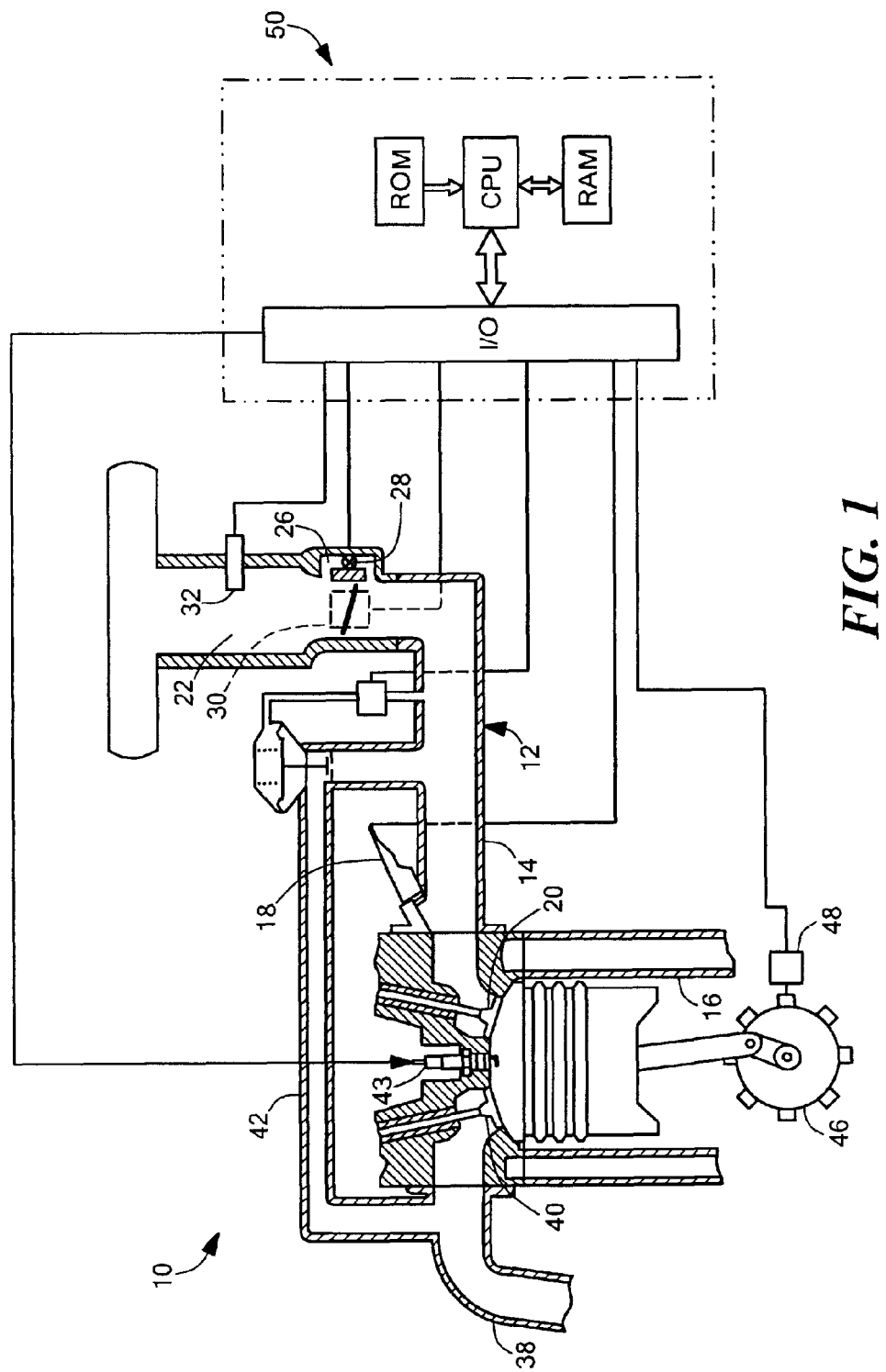
FIG. 1 is a diagram of an engine having a spark timing system according to the invention.

Referring now to the drawings, FIG. 1 illustrates schematically in cross-section an internal combustion engine 10 to which the embodiments of the present invention are applied. The engine 10 includes an intake manifold 12 having a plurality of runners 14 (only one of which is shown) which are individually connected to a respective plurality of combustion chambers 16 via a conventional intake port in the cylinder head as illustrated. A fuel injector 18 is coupled to each runner 14 near an intake valve 20 of each respective chamber 16. The intake manifold 12 is also connected to an throttle body 22 which includes a throttle valve 24, a bypass passage 26 which leads around the throttle valve 24 for, inter alia, idle control, and an air bypass valve 28. A position sensor 30 is operatively connected with the throttle valve 24 for sensing the angular position of the throttle valve 24. The throttle body 22 further includes a mass air-flow sensor 32, such as a hot-wire air meter.

The engine 10 further includes an exhaust manifold 38 connected to each combustion chamber 16 via a conventional exhaust port as illustrated. Exhaust gas generated during combustion in each combustion chamber 16 is released into the atmosphere through an exhaust valve 40 and the exhaust manifold 38. In communication with both the exhaust manifold 38 and the intake manifold 12 is an EGR (exhaust gas recirculation) passageway 42.

Operatively connected with the crankshaft 46 of the engine 10 is a crank angle detector 48 which detects the rotational speed (N) of the engine 10. Ignition of the air/fuel mixture within combustion chamber 16 is initiated by firing spark plug 43.

In accordance with the present invention, an engine control unit 50 is provided which is capable of determining an estimate of airflow into a combustion chamber, i.e., cylinder air charge, and a spark advance parameter based on the estimated airflow. The engine control unit 50 preferably comprises a microprocessor. The control unit 50 is arranged to receive inputs from the throttle valve position sensor 30, the mass airflow sensor 32 and the crank angle detector 48 via an I/O interface. The read only memory (ROM) of the control unit 50, here a semiconductor chip, stores computer code for various operating steps representing control logic and predetermined data. By employing the stored steps, the predetermined data and the inputs described above, the control unit 50 is capable of controlling the spark timing to reduce engine knock during rapid transient operating conditions.

Figure 2:
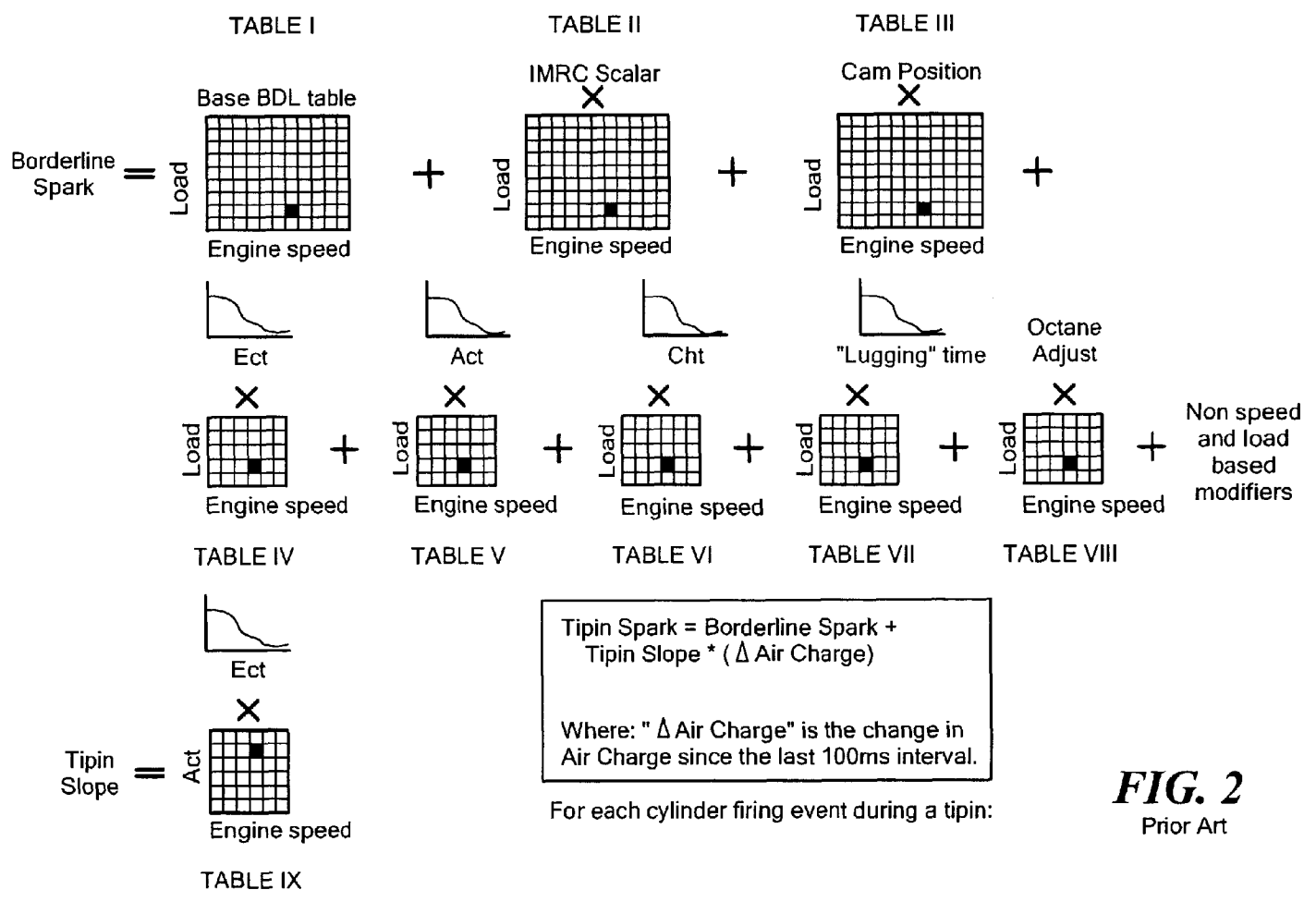

In the absence of a detected tip-in event, an MBT spark timing is calculated at a background rate, here, for example, once every 100 milliseconds. This calculation is made by processing information in the tables such as those described above in connection with FIGS. 2 and 3 for borderline timing but here the tables used provide the data for MBT spark timing (i.e., spark timing for peak fuel economy and power).

Also calculated at the background computational rate is borderline spark timing. This calculation is made by processing information in the TABLES I–IX described above in connection with FIG. 3.

Figure 3:
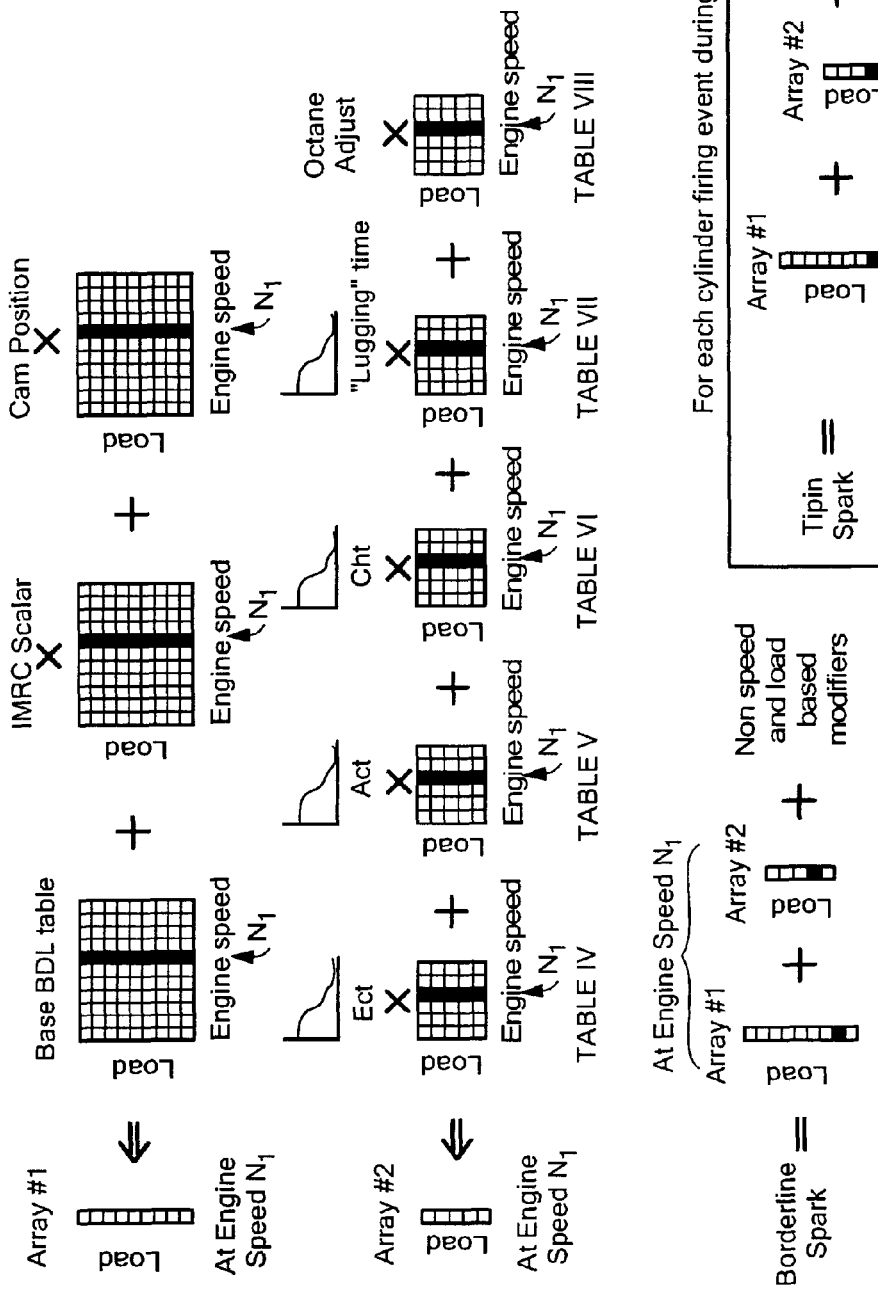
FIG. 3 are tables used to calculate spark timing of the internal combustion engine of FIG. 1 according to the invention.

Also calculated at the background rate from the borderline TABLES I–III is a one-dimensional table shown in FIG. 3. More particularly, at the background computational rate, the columns in the TABLES I–III for the current engine speed, for example the engine speed indicated in FIG. 3 as engine speed $N_1$, are summed and placed in a one-dimensional ARRAY 1. It is noted that the rows in the one-dimensional (i.e., single column) array 1 contains the borderline timing factors for various load (i.e., cylinder air charge values).

Also formed at the background computational rate, the columns in the TABLES IV–VIII for the current engine speed, here, in this example, the engine speed $N_1$, are weighted appropriately as described in connection with FIG. 3 and then summed to form a second one-dimensional array 2. It is noted that the rows in the one-dimensional (i.e., single column) array 2 contains the borderline timing factors for various load (i.e., cylinder air charge values).

If a tip-in event is in progress, a foreground borderline spark timing computation is performed for each cylinder firing event. The foreground borderline spark timing is calculated from the one-dimensional arrays 1 and 2 using as the input to such arrays 1 and 2, the measured cylinder air charge. The tip-in spark timing is set equal to this foreground borderline spark timing value. If a tip-in event is not in progress, then it can be assumed that the measured air charge is not changing significantly. In this case, there is no need to perform the foreground borderline spark timing computation since the background rate computation will be sufficient to prevent knock. The final spark timing value is calculated which is to be used for the next cylinder firing event. The spark timing used will be the most retarded of the background rate calculated MBT spark timing, the background rate calculated borderline spark timing, and the foreground rate calculated tip-in spark timing value (if a tip-in is in progress).

A number of embodiments of the invention have been described. Nevertheless, it will be understood that various modifications may be made without departing from the spirit and scope of the invention. Accordingly, other embodiments are within the scope of the following claims.

What is claimed is:

1. A method for controlling spark timing in an internal combustion engine, such method comprising:
   determining background borderline spark timing at a background computational rate, such borderline spark timing being a function of determined air charge and engine speed; and,
   determining foreground borderline spark timing at a foreground computational rate, such foreground computational rate being higher than such background computational rate, the foreground borderline spark timing being a function of air charge determined at the foreground computational rate and engine speed measured at the background computational rate.

2. A method for controlling spark timing in an internal combustion engine, such method comprising:
   determining background borderline spark timing at a background computational rate, such borderline spark timing being a function of determined air charge and engine speed measured at the background computational rate; and,
   in response to a tip-in event, determining foreground borderline spark timing at a higher, foreground computational rate, the foreground borderline spark timing being a function of air charge determined at the foreground computational rate and the engine speed measured at the background computational rate.

3. A method for controlling spark timing in an internal combustion engine, such method comprising:
   providing a plurality of tables, each one of such tables providing borderline timing data contributors for each of a corresponding one of a plurality of different engine operating conditions, the borderline timing contributors in each one of the tables being a function of engine speed and air charge;
   determining background borderline spark timing at a background computational rate, such borderline spark timing being determined from a summation of the borderline timing data in the plurality of tables data in the plurality of tables at engine speed measured at the borderline computational rate and air charge determined at the borderline computational rate;
   providing a one-dimensional table, such one-dimensional table having borderline timing data contributors extracted from the plurality of provided tables the borderline timing data contributors for the engine speed measured at the borderline computational rate and the air charge determined at the borderline computational rate;
   determining from the one-dimensional table foreground borderline spark timing at a higher, foreground computational rate, the foreground borderline spark timing being a function of air charge determined at the foreground computational rate and engine speed measured at the background computational rate.

4. The method recited in claim 3 wherein the foreground computational rate is the firing rate of cylinders in the engine.

5. The method recited in claim 4 wherein the foreground borderline spark timing is determined in response to a tip-in event.

6. The method recited in claim 5 wherein engine spark plug timing is a most retarded timing of a group of spark timings, such group including MBT timing, borderline timing, and the tip-in timing.

7. A system for controlling spark timing in an internal combustion engine, comprising:
   a control unit programmed to:
   determine background borderline spark timing at a background computational rate, such borderline spark timing being a function of determined air charge and engine speed; and,
   determine foreground borderline spark timing at a higher, foreground computational rate, the foreground borderline spark timing being a function of air charge determined at the foreground computational rate and engine speed measured at the background computational rate.

8. A system for controlling spark timing in an internal combustion engine, comprising:
   a control unit programmed to:
   determine background borderline spark timing at a background computational rate, such borderline spark timing being a function of determined air charge and engine speed measured at the background computational rate; and,
   in response to a tip-in event, determine foreground borderline spark timing at a higher, foreground computational rate, the foreground borderline spark timing being a function of air charge determined at the foreground computational rate and the engine speed measured at the background computational rate.

9. A system for controlling spark timing in an internal combustion engine, comprising:
   a plurality of tables, each one of such tables providing borderline timing data contributors for each of a corresponding one of a plurality of different engine operating conditions, the borderline timing contributors in each one of the tables being a function of engine speed and air charge;
   a one-dimensional table, such one-dimensional table having borderline timing data contributors extracted from the plurality of provided tables the borderline timing data contributors for the engine speed measured at the borderline computational rate and the air charge determined at the borderline computational rate;
   a control unit programmed to:
   determine background borderline spark timing at a background computational rate, such borderline spark timing being determined from a summation of the borderline timing data in the plurality of tables data in the plurality of tables at engine speed measured at the borderline computational rate and air charge determined at the borderline computational rate;
   determine from the one-dimensional table foreground borderline spark timing at a higher, foreground computational rate, the foreground borderline spark timing being a function of air charge determined at the foreground computational rate and engine speed measured at the background computational rate.

10. The system recited in claim 9 wherein the foreground computational rate is the firing rate of cylinders in the engine.

11. The method recited in claim 10 wherein the foreground borderline spark timing is determined in response to a tip-in event.

12. The system recited in claim 11 wherein engine spark plug timing is a most retarded timing of a group of spark timings, such group including MBT timing, borderline timing, and the tip-in timing.

13. A data storage media having a computer executable program such program, when executed, controlling spark timing in an internal combustion engine, such program comprising:

code for determining background borderline spark timing at a background computational rate, such borderline spark timing being a function of determined air charge and engine speed; and, code for determining foreground borderline spark timing at a higher, foreground computational rate, the foreground borderline spark timing being a function of air charge determined at the foreground computational rate and engine speed measured at the background computational rate.

14. A data storage media having a computer executable program such program, when executed, controlling spark timing in an internal combustion engine, such program comprising:

code for determining background borderline spark timing at a background computational rate, such borderline spark timing being a function of determined air charge and engine speed measured at the background computational rate; and, in response to a tip-in event, code for determining foreground borderline spark timing at a higher, foreground computational rate, the foreground borderline spark timing being a function of air charge determined at the foreground computational rate and the engine speed measured at the background computational rate.

15. The data storage media of claim 13, wherein said storage media comprises a computer chip.

16. The data storage media of claim 14 wherein said storage media comprises a computer chip.

* * * * *